United States Patent
Perilhou et al.

[15] 3,670,715
[45] June 20, 1972

[54] DEVICE FOR MEASURING THE FLOW OF BLOOD

[72] Inventors: Jean Robert Perilhou, Bourg-La-Reine; Michel Joseph Auphan, Courbevoie, both of France

[73] Assignee: U.S. Philips Corporation, New York, N.Y.

[22] Filed: Feb. 11, 1970

[21] Appl. No.: 10,519

[30] Foreign Application Priority Data

Feb. 12, 1969 France....................6903308

[52] U.S. Cl. ............128/2.05 V, 250/71.5 R, 250/71.5 S, 250/106 T
[51] Int. Cl...........................A61b 5/02, G01t 1/20
[58] Field of Search............250/43.5 FC, 71.5 R, 71.5 S, 250/106 T; 128/2.05 R, 2.05 F, 2.05 V, 2.1 R

[56] References Cited

UNITED STATES PATENTS 2,640,936  6/1953  Pajes...................250/43.5 FC X
3,115,576  12/1963  Rickard................250/43.5 FC
3,239,663  3/1966  Oshry et al............250/43.5 FC

OTHER PUBLICATIONS

Advances in Activation Analysis, Vol. 1, Edited by Lenihan et al., Academic Press, Copyright 1969, pp. 198, 199.

Primary Examiner—Archie R. Borchelt
Attorney—Frank R. Trifari

[57] ABSTRACT a. The device according to the invention permits of measuring the flow of liquids which contain oxygen, especially blood flow.

b. It comprises a pulsed neutron source which partly irradiates the liquid; the oxygen $O^{16}$ of the liquid is converted into $N^{16}$ which emits radiation.

A detector measures the radioactivity of the liquid as a function of flow.

c. The device can be used especially in medical diagnosis for measuring blood flow, for example cardiac output, arterial flow or the supply of blood to an organ.

5 Claims, 4 Drawing Figures

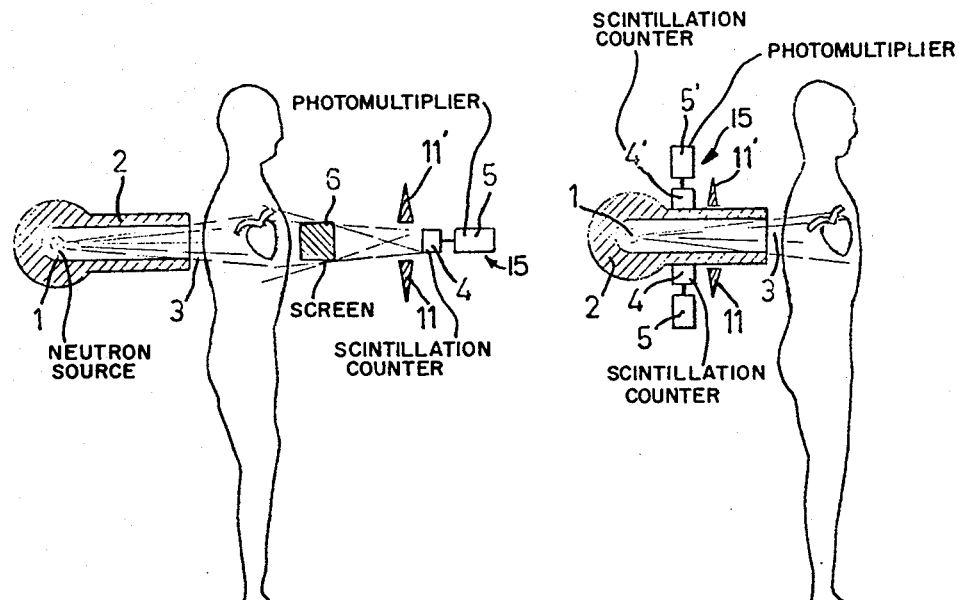
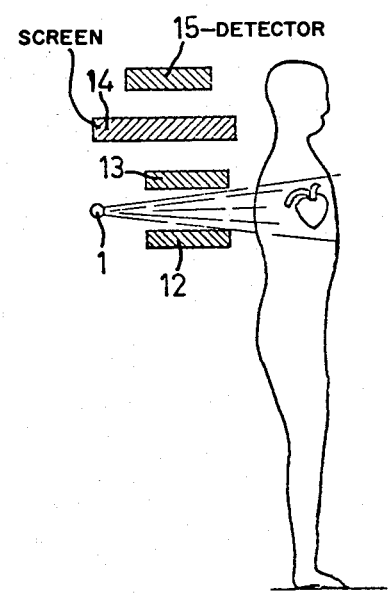
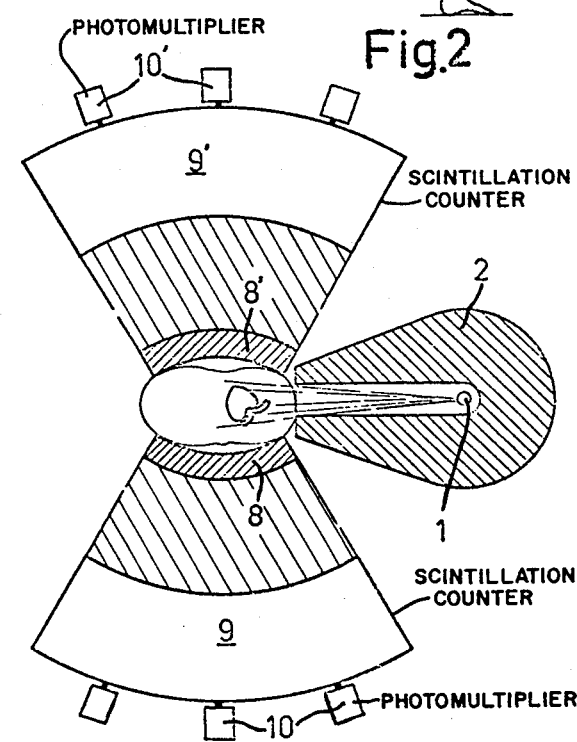

DEVICE FOR MEASURING THE FLOW OF BLOOD

The present invention relates to a device for measuring the flow of a liquid containing oxygen atoms, the device may, in particular, be applied to medical diagnosis for measuring blood flow: for example, cardiac output and flow in arteries or veins.

Numerous methods have been proposed for measuring liquid flow and especially cardiac output, which, in general, require the injection of an auxiliary fluid: for example, a fluid at a temperature different from the blood temperature or a radioisotope.

Such injections, even if they are restricted to the use of a needle or a microcatheter, always are more or less traumatizing, especially for a sick person.

It is an object of the invention to remedy this difficulty and to provide a device which dispenses with the need for an injection.

According to the invention a device for measuring the flow of a liquid containing oxygen atoms, especially blood, comprises a pulsed neutron source disposed externally of the said liquid and partially irradiating it; the radiation of the source, which is referred to as primary radiation, makes the liquid radioactive so as to emit a secondary radiation, means being provided to detect at least part of the secondary radiation, which permits evaluating the flow of the liquid.

The method used in the device according to the invention is based, in the case of blood, on the radio-activation of the oxygen of the tissues most of which contain water. By irradiation with neutrons, $O^{16}$ yields $N^{16}$ having a life time of about 7.5 seconds and emitting gamma radiation of from 6 to 8 Mev.

Several features of the invention will appear from a perusal of the following description, given by way of example only, with reference to the accompanying diagrammatic drawings, in which:

FIGS. 1, 2 and 3 show different embodiments of the device according to the invention adapted to measuring the cardiac output and FIG. 4 shows an embodiment of the device according to the invention adapted to measure the flow in an organ.

According to the principle of the device, a neutron source 1 disposed in a partly cylindrical screening envelope 2 emits radiation (hereinbefore referred to as primary radiation) in a cone 3 of small aperture which is limited by the walls of the envelope. The envelope is disposed near the breast of the patient. The effective cross-sectional area of the envelope (which may be adjustable so as to be adapted to individual patients) is such that the substantially cylindrical volume of irradiated tissues includes the heart, but this adjustment is not critical.

The neutron source 1 is pulsed, and the pulses, which may have a duration of about 0.01 second, may be generated at the beginning of the systole, at which instant the ventricles start emptying.

In a first method, which is not shown in the figures, a detector placed near the heart provides, immediately after the pulse from the source, a measurement of the $\gamma$ radiation emitted by the irradiated tissues and by the blood contained in the ventricles.

In course of time the blood leaves the ventricles and the radiation detected diminishes. The difference between the measurements made immediately after the irradiation and at the end of the contraction of the ventricles is proportional to the quantity of blood issued from the heart (cardiac output).

According to a second method, which is performed in the devices shown in the FIGS. 1 to 4, at least one radiation detector 15, which may comprise a scintillation counter 4 and a photomultiplier 5, is placed near the heart in a shadow region which protects it on the one hand from the neutron radiation and on the other band from the radiation emitted by the cylinder of irradiated tissues.

When the ventricles contract, the blood is driven into the aorta, the pulmonary artery and the afferent vessels, which for the larger part are outside the shadow region. The detector 15 measures the radiation emitted by the various vessels on the termination of the contraction of the ventricles, the radiation is proportional to the quantity of blood driven out. On the analogy of the first method, it may be considered that the measurement immediately after the irradiation is zero and that the difference is reduced to the mere measurement of the radiation on termination of the contraction of the ventricles.

In FIG. 1, the detector 15 is arranged in line with the envelope of the other side of the patient, and the shadow region is defined by a screen 6 which absorbs the neutron and $\gamma$ radiations, is sufficiently thick and has a section about equal to that of the envelope.

In FIG. 2, two scintillation counters 4, 4' and two associated photomultipliers 5, 5' respectively are disposed around the envelope 2, the shadow region being defined by the envelope itself.

In FIG. 3, the envelope is disposed by the side of the patient while the detectors are disposed before and behind him and isolated from him by $\gamma$ radiation absorbing screens 8 and 8' shaped so as to envelope the region of the heart in a manner such as to delimit the aforementioned shadow region. The detectors 15 shown in FIG. 3 are constituted on either side of the patient by a single scintillation counter 9 and 9' associated with a series of photomultipliers 10 and 10', respectively.

According to one embodiment of the invention and for the second method one or more $\gamma$ radiation absorbing screens 11, 11' are preferably provided the contours of which are designed in accordance with the average contour of the human body in order to compensate for the reduction of the radiation in inverse proportion to the square of the distance.

For a more accurate measurement in designing such a screen the period of $N^{16}$, i.e. about 7.5 seconds, is to be taken into account.

In all the embodiments, before any measurements are made, the apparatus is calibrated in absolute value, for example by irradiating serum contained in a bottle made of a material containing no oxygen atoms and of known volume which is spaced from the neutron source by the same distance as is the heart. The radiation detected in this manner substantially corresponds to the natural radiation of the same volume of blood.

The device according to the invention may also be used for measuring the blood flow in an organ, for example the head or a limb. In this case the embodiment may be simplified, as is shown in FIG. 4, with consequent reduction of its weight and bulk.

The screening envelope is replaced by a system of screens: screens 12 and 13 which restrict the neutron irradiation to the heart region, and a screen 14, which absorbs both radiations. These constitute screening between the source 1 and the detector 15 and also a screen from $\gamma$ radiation, so that the detector 15 receives no other radiation but that from the member in which the flow is to be measured the head in this example.

Apart from being used for measuring the cardiac output and the blood flow in an organ, the device according to the invention is adapted to measure local fluid flow, in particular blood flow in certain arteries, the blood, for example, being irradiated in a region upstream of the part in which the flow is to be measured (this part is not irradiated).

Owing to the poor miscibility of the arterial blood, the irradiated blood shows a radioactive front which travels at the same speed as does the blood flow. Two spaced detectors 15 permit the detection of the arrival of this radioactive front at different instants. The flow speed is calculated from the time difference and from the distance between the detectors, and when the diameter of the artery is approximately known the blood flow can be deduced.

The present invention is not restricted to the example described, and modifications may be made without departing from the scope of the invention, for example modifications in the disposition and form of the various elements and in the manner of radiation detection.

We claim:

1. A method for measuring the cardiac output of a heart in an animal body, comprising the steps of irradiating a substantially cylindrical portion of said body including the heart with a dose of neutrons at the instant ventricles of the heart are filled with blood, measuring gamma radiation level emitted by the irradiated portion of the body immediately after the irradiation in a shadow region with respect to the dose of neutrons, measuring gamma radiation level emitted by the irradiated portion of the body at the end of a contraction of the ventricles in said shadow region and determining the difference in the levels of the gamma radiation measurements.

2. A method for measuring the cardiac output of a heart in an animal body comprising the steps of irradiating a substantially cylindrical portion of said body including the heart with a dose of neutrons at the instant ventricles of the heart are filled with blood, and measuring the gamma radiation level emitted by a part of the body outside said irradiated portion at the end of a contraction of the ventricles in a shadow region with respect to the dose of neutrons.

3. A device for measuring the cardiac output in an animal body comprising a pulsed neutron source contained within a neutron absorbing envelope having an opening adapted to emit a substantially cylindrical beam of neutrons, a radiation detector to measure gamma radiation, screening means to prevent neutrons from said neutron source and gamma radiation from the region that has been irradiated by said beam of neutrons from reaching the radiation detector along a direct path, and absorbing means adapted to compensate for gamma radiation reduction in accordance with distance between the radiation detector and a point of gamma radiation emission.

4. A device as claimed in claim 3, wherein the radiation detector is opposite the neutrons emitting opening and the screening means is located between said radiation detector and said opening.

5. A device as claimed in claim 3, wherein the radiation detector is located next to a lateral wall of said envelope and the screening means forms a part of said lateral wall.

* * * * *